(12) United States Patent
Singla et al.

(10) Patent No.: US 11,963,077 B2
(45) Date of Patent: Apr. 16, 2024

(54) BLOCKCHAIN-BASED SYSTEM FOR CONNECTED VEHICLES

(71) Applicant: HEWLETT PACKARD ENTERPRISE DEVELOPMENT LP, Houston, TX (US)

(72) Inventors: Nitin Singla, Bangalore (IN); Thomas Golway, Plandome, NY (US); Yashavantha Nagaraju Naguvanahalli, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 426 days.

(21) Appl. No.: 17/223,749

(22) Filed: Apr. 6, 2021

(65) Prior Publication Data
US 2021/0409915 A1 Dec. 30, 2021

(30) Foreign Application Priority Data
Jun. 29, 2020 (IN) .............................. 202041027602

(51) Int. Cl.
*H04W 4/40* (2018.01)
*G06Q 50/18* (2012.01)
*H04L 9/06* (2006.01)
*H04W 4/38* (2018.01)
*H04L 9/00* (2022.01)

(52) U.S. Cl.
CPC ............ *H04W 4/40* (2018.02); *G06Q 50/188* (2013.01); *H04L 9/0643* (2013.01); *H04W 4/38* (2018.02); *H04L 9/50* (2022.05)

(58) Field of Classification Search
CPC ........ H04W 4/40; H04W 4/38; G06Q 50/188; H04L 9/0643; H04L 9/50; H04L 67/12; H04L 9/3239; H04L 63/102; G06F 21/64
See application file for complete search history.

(56) References Cited

U.S. PATENT DOCUMENTS

2019/0279508 A1 9/2019 Wang
2019/0301883 A1 10/2019 Xia
(Continued)

FOREIGN PATENT DOCUMENTS

CN 110460667 A 11/2019

OTHER PUBLICATIONS

Lai, C. et al., "SPIR: A Secure and Privacy-Preserving Incentive Scheme for Reliable Real-Time Map Updates," IEEE Internet of Things Journal, vol. 7, No. 1, Nov. 12, 2019, pp. 416-428, https://ieeexplore.ieee.org/abstract/document/8896960.
(Continued)

*Primary Examiner* — Peter D Nolan
*Assistant Examiner* — Roy Rhee
(74) *Attorney, Agent, or Firm* — Hewlett Packard Enterprise Patent Department

(57) ABSTRACT

Examples described herein relate to a system including a BC network associated with a plurality of entities in a defined geographic scope. A first entity of the plurality of entities includes a connected vehicle that generates vehicular data. The BC network is governed by a smart contract. The smart contract includes a data sharing policy defined by a user of the connected vehicle, wherein the data sharing policy allows the user of the connected vehicle to selectively share the vehicular data with one or more other entities of the plurality of entities.

20 Claims, 5 Drawing Sheets

(56) References Cited

U.S. PATENT DOCUMENTS

| | | |
|---|---|---|
| 2020/0034876 A1 | 1/2020 | Soundararajan et al. |
| 2020/0074853 A1* | 3/2020 | Miller et al. |
| 2020/0219045 A1* | 7/2020 | Kikinis .............. G06Q 20/3672 |
| 2021/0347276 A1* | 11/2021 | Lu ...................... G06Q 30/0283 |

OTHER PUBLICATIONS

Evans Claire, "What is a connected car and what are its benefits?", available online at <https://www.whatcar.com/news/what-is-a-connected-car-and-what-are-its-benefits/n18929>, Feb. 20, 2019, 6 pages.

Martin, Rick, "10 Applications for Blockchain in Connected Car Automotive", Ignite, available online at <https://web.archive.org/web/20200815210654/https://igniteoutsourcing.com/blockchain/blockchain-automotive-industry/>, Nov. 29, 2018, 17 pages.

Mckinsey & Company, "What's driving the connected car", available online at <https://www.mckinsey.com/industries/automotive-and-assembly/our-insights/whats-driving-the-connected-car>, Sep. 1, 2014 , 3 pages.

* cited by examiner

BLOCKCHAIN-BASED SYSTEM FOR CONNECTED VEHICLES

BACKGROUND

Connected devices are physical objects that can connect with each other and other systems via the Internet. Internet of Things (IoT) is the network of connected devices and other items embedded with electronics, software, sensors and network connectivity which enables these devices to exchange data. IoT refers to the interconnection of devices within a local and/or wide area network infrastructure, including the Internet. IoT enables a wide-range of applications such that the physical object may provide information about itself or its surroundings.

For example, connected vehicles may include IoT devices that connect to other devices within the vehicles and networks. A connected vehicle such as connected car has its own connection to the internet, often via a wireless local area network (WLAN), that allows the vehicle to share data with other devices inside and outside the vehicle.

DETAILED DESCRIPTION

Figure 1:
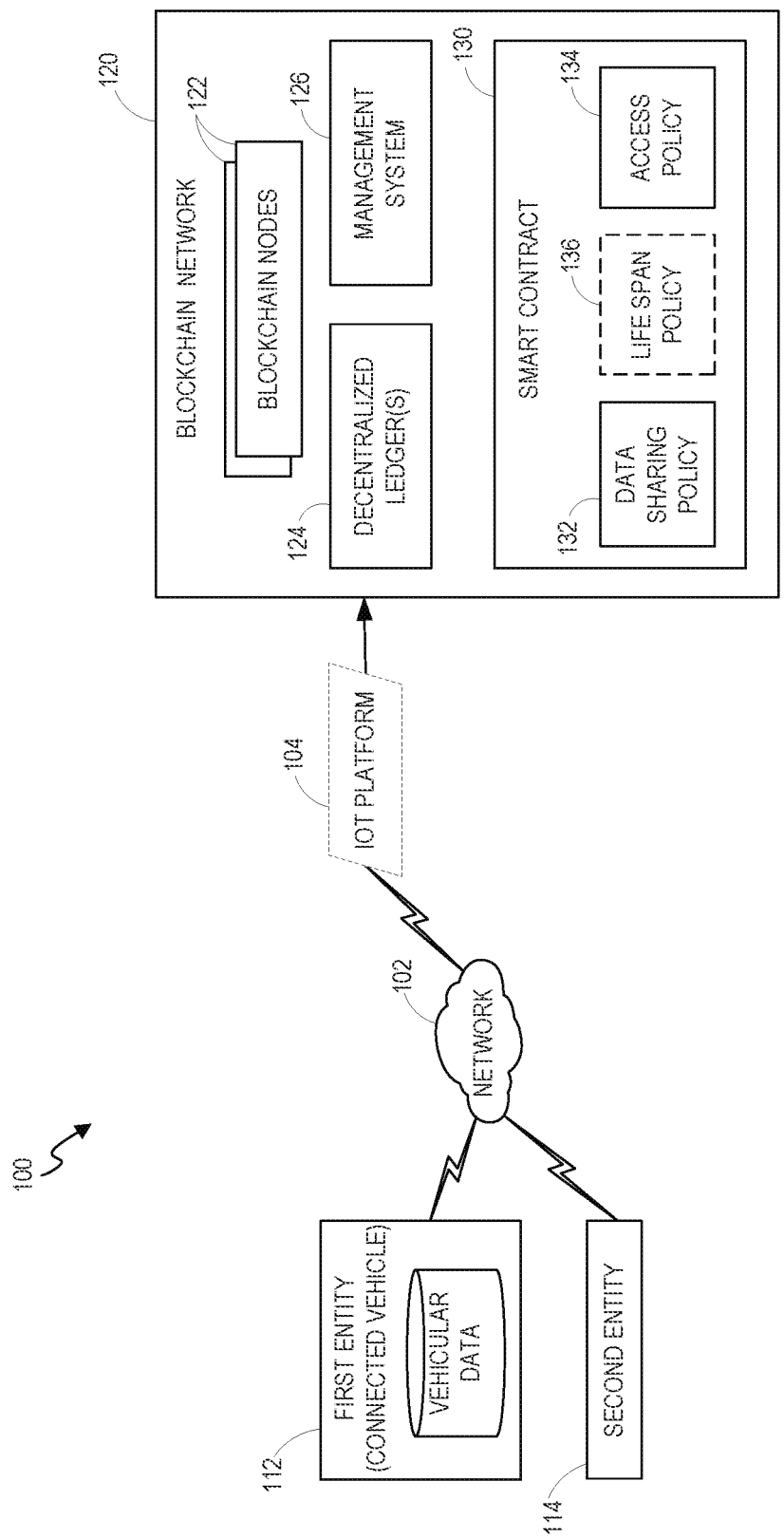
FIG. 1 is a block diagram of a system including a blockchain (BC) network associated with a first entity including a connected vehicle and a second entity, in accordance with an example.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two as or more than two. The term "another," as used herein, is defined as at least a second or more. The term "associated," as used herein, is defined as connected or coupled, whether directly without any intervening elements or indirectly with at least one intervening element, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise.

The presence of IoT computing technologies allows connected vehicles to access data and connect with other connected devices. Connected vehicles keep generating data related to vehicles' operation and the surrounding environment of the vehicles. The data may be communicated on a real-time basis with the user (e.g., driver) of the vehicle and other connected devices present in the environment such as vehicles (vehicle-to-vehicle (V2V)), surrounding infrastructure (vehicle-to-infrastructure (V2I)), and the cloud (V2C).

Operating connected vehicles may also involve secure and autonomous communication for transmission of data from malicious attacks on data through breach and theft. As the connected vehicles industry evolves, security may become a challenge. The more connected a vehicle is, the more susceptible it may become to potential security breaches, which may result in damaging losses. Though the data may be protected through safe channels and encryption, challenges related to the credibility remain. Furthermore, the management of connected vehicles may raise a variety of different security issues. For example, sharing all the data with other connected vehicles and connected devices may affect safety and security. Also, telematics devices in the vehicles include software-based navigation, V2V communications and other services that may affect vehicles' safety and passengers' security.

Examples described herein address these technological problems by allowing secure and autonomous communication among connected vehicles for sharing their data (i.e., vehicular data), using blockchain technology. The use of a blockchain (BC) network may enable interaction among non-trusting members (e.g., users of vehicles) with one another and sharing data in a secure and verifiable manner. In examples described herein, the system involving a BC network may provide control to users of vehicles over privacy and security while sharing their vehicular data. In particular, a user of a connected vehicle may have control on what type of data is shared with another connected vehicle or any other entity.

In an aspect of the present disclosure, a system is for sharing vehicular data. The system may include a BC network associated with a plurality of entities in a defined geographic scope. The plurality of entities may include a connected vehicle that generates vehicular data. The BC network may be governed by a smart contract that includes a data sharing policy defined by a user of the connected vehicle. The data sharing policy allows the user of the connected vehicle to selectively share the vehicular data with one or more other entities of the plurality of entities participating in the BC network. Data sharing policy, as used herein, may refer to terms defined by a user of a connected vehicle as a contract for selectively sharing vehicular data of the connected vehicle with different entities of the plurality of entities participating in the BC network.

A connected vehicle may be any vehicle that is equipped with internet connectivity and IoT devices that enables the vehicle to communicate with other connected devices. Examples of connected vehicles may include land vehicles (e.g., wagons, bicycles, etc.), motor vehicles (e.g., motorcycles, cars, trucks, buses, etc.), railed vehicles (e.g., trains, trams, etc.), watercrafts (e.g., ships, boats, etc.), amphibious vehicles (e.g., screw-propelled vehicles, hovercrafts, etc.), aircrafts (e.g., airplanes, helicopters, etc.) and spacecrafts. The connected vehicle may include an electric vehicle or a non-electric vehicle such as a vehicle based on combustion engines or non-electric engines. In an example, the connected vehicle may be an autonomous driving vehicle that may be fully autonomous, partially autonomous, or unmanned.

Vehicular data may be data generated by a connected vehicle via various technologies implemented in the connected vehicle. For example, vehicular data may include telemetry data collected through smart sensors, IoT devices, vehicle actuators etc. IoT devices may collect onboard data from other devices (e.g., cameras, radars, monitoring devices, etc.) within the vehicle and vehicle-to-vehicle (V2V) data from other vehicles, vehicle-to-infrastructure (V2I) from surrounding infrastructure, and vehicle-to-cloud (V2C) from the cloud. Vehicle's onboard data may include information related to the vehicle's driving data, the vehicle's part data, insurance records, fuel level, road conditions, traffic information, roadside assistance, location-specific driving regulations, weather information etc. Other vehicular data that may be collected through V2V and/or V2I may include information related to traffic violation, unsafe driving, etc.

As used herein, the term "geographic scope" may refer to one or more physical regions associated with web resource/internet such that an entity located in one region and connected to the internet may communicate with another entity located in another such region and connected to the internet. In an example, geographic scope may include regions in different geographic locations and/or timezones. For example, a geographic scope may be defined to include regions in different countries or even in different continents. In some examples, geographic scope may be defined to include a localized region in a particular area (e.g., regions in a city or a state).

In an example, the geographic scope may be defined based on the data sharing policy(s). In such examples, the geographic scope may be defined to include one or more regions based on what type of vehicular data to be shared with different entities and the locations of the entities participating in the BC network. For example, when vehicular data of a connected vehicle may include information about traffic and road condition in an area inside a localized region, this vehicular data may be of interest to users of other connected vehicles moving in that localized region. In such example, geographic scope is defined to include the localized region in which all of these connected vehicles are present. Another example may be a manufacturer monitoring warrantee information. In these instances, geographic scope may be defined to include regions in different cities, states, or countries that are relevant to the manufacturer (for example, where the manufacturer has sold its devices, etc.).

A "blockchain" may be a digital ledger for maintaining records of a sequence of executed transactions or events in blocks, which are linked cryptographically. A "block" may be a unit of data recordation for a blockchain. Each block may contain information indicating the corresponding transaction and a cryptographic hash of prior block, linking the two blocks. This way, blocks may be chained together by including the cryptographic hash of the prior block in the blockchain. Such chaining of blocks may confirm the integrity of a block and make it difficult to alter a block in the blockchain without such alteration being readily detectable. In some examples, a blockchain may be implemented in a BC network, which may comprise a plurality of nodes to implement the BC network. In such examples, the BC network may implement a blockchain as a distributed ledger, which is a form of a decentralized database that may be stored at one or more nodes participating in the BC network (e.g., participant nodes or blockchain nodes, such as respective computing devices). In such examples, each node participating in a BC network may get a copy of the blockchain (i.e. the distributed ledger), which may be downloaded automatically upon enrolling (e.g., registering as per a registration model to access the BC network) for the blockchain network. In these implementations, each participant node may need to enroll with the BC network according to an access policy (including a registration model to access the BC network) to use or access the distributed ledger. The registration model may involve a subscription fee depending on the purpose of an enterprise. In some examples, the enrollment may be a part of an overall BC network for an entity accessing the BC network. An entity (referred to as participant entity) may access the BC network through one or more participant nodes.

At least some blockchain nodes may maintain the blockchain and cryptographically validate each new block added to the blockchain, and the transaction(s) represented in the corresponding block. The blockchain system may record information identifying the blockchain nodes and information identifying an owner of each block. An owner of a block may be a blockchain node that provides data to create that block in the distributed ledger.

Further, a BC network may be implemented as public or private. In a private BC network, the access to the BC network may be restricted for securing its privacy. For example, in such implementations, participant entities through participant nodes of the BC network may be assigned with certain protocols and permissions to access the BC network. For example, some participant entities may have only read permissions while other participant entities may have read and write permissions. Further, the BC network may be permissioned or permissionless. Some participant entities, for example, may access data pertaining only to them via public-private key encryption. In this example, data on the private distributed ledger may be relevant to a given participant entity that may be encrypted using a blockchain public key such that only a blockchain private key can decrypt its contents.

In some examples, a BC network may be a sidechain. A sidechain is a separate BC network that is attached to an original BC network. The original blockchain is usually referred to as the 'main chain' and all additional blockchains are referred to as 'sidechains'. Sidechains allow tokens and other digital assets from main blockchain to be securely used in a separate blockchain and then be moved back to the original blockchain if needed. This way, a subset of a plurality of entities can share data among themselves and share a subset of data to the main blockchain.

Although the one or more portions of the description herein are with reference to one connected vehicle, the methods and described techniques may be utilized for several connected vehicles. Furthermore, many process and functions performed by the BC network, as described herein, may be performed by one or more components of the BC network. Various implementations of the present subject matter have been described below by referring to several examples.

FIG. 1 illustrates a system for sharing vehicular data among a plurality of entities, in a defined geographic scope, using a BC network. As shown in FIG. 1, example system 100 may include a first entity 112 and a second entity 114 associated to a BC network 120. The first entity 112 and the second entity 114 may be participants to the BC network 120.

The BC network 120 may be coupled to the first entity 112 and the second entity 114 via a network 102. The network 102 may be wired or wireless. In examples described herein, the network 102 may include, for example, a local area network (LAN), a virtual LAN (VLAN), a wireless local area network (WLAN), a virtual private network (VPN), the Internet, or the like.

Although FIG. 1 depicts the first entity 112 and the second entity 114 for purposes of clarity and conciseness, system 100 may include any number of entities present in a defined geographic scope. Examples of entities may include, but are not limited to, organizations, institutes, consortiums, agencies, service providers, suppliers, retailers, other connected vehicles, or the like.

In accordance with some aspects of the present disclosure, the first entity 112 may be a connected vehicle that generates vehicular data. The connected vehicle 112 may provide the vehicular data to BC network 120 for sharing with the second entity 114. The second entity 114 may be any entity that may be interested in all or partial of the vehicular data generated by connected vehicle 112. For example, the second entity 114 may be an organization, institute, consortium, agency, service provider, supplier, retailer, or another connected vehicle. In an example, the second entity 114 may be a government entity for road safety that may be interested in vehicular data related to road conditions, vehicle driving, insurance records, traffic violation, unsafe driving etc. In another example, the second entity 114 may be an insurance entity that may be interested in the vehicular data related to vehicle parts, vehicle usage driving etc. In yet another example, the second entity 114 may be another connected vehicle that may be interested in the vehicular data related to road condition, traffic congestion, roadside assistance, etc. that connected vehicle 112 encounters. In such example, another connected vehicle may also provide its vehicular data for sharing with the connected vehicle 112.

The first entity 112 and the second entity 114 may access the BC network 120 through a plurality of nodes (i.e., participant nodes) via the network 102. Each entity i.e., the first entity 112 and the second entity 114 may be associated with one or more participant nodes. Participant nodes may include, but are not limited to, IoT devices, tablet, laptop, smartphone, smartwatch, and/or other devices that can access the BC network 120. For example, IoT devices in a connected vehicle (e.g., the connected vehicle 112) may be the participant nodes that can access the BC network 120. In other example, a government entity or a service provider may access the BC network 120 through a laptop, tablet, smartphone or the like.

As described, the connected vehicle may provide the vehicular data to the BC network 120. In some examples, IoT devices of the connected vehicle 112 may be programmed to provide all or partial of the vehicular data of connected vehicle 112 to the BC network 120. For example, a user or a manufacturer of the connected vehicle 112 may program one or more IoT devices of the connected vehicle 112 to provide the vehicular data. That is, the BC network 120 may receive a pool of vehicular data from the IoT device(s) of the connected vehicle 112. In some examples, the BC network 120 may receive the pool of vehicular data from the IoT device(s) of the connected vehicle 112 via an IoT platform 104. In such examples, IoT device(s) of the connected vehicle 112 may be programmed to provide the vehicular data to the IoT platform 104 that provides the pool of vehicular data to the BC network 120. Furthermore, the IoT devices of the connected vehicle 112 may be programed to continue providing vehicular data in periodic or random time intervals, as the connected vehicle 112 operates or moves. In an example, connected vehicle 112 via IoT devices may continue providing vehicular data periodically. For example, vehicular data generated in a time interval may be provided to the BC network 120 at the expiration of that time interval. In examples when another connected vehicle is a participant of the BC network 120, IoT devices of the other connected vehicle may be programmed to provide all or partial of its vehicular data to the BC network 120. In some examples, this may be provided via IoT platform 104.

Further, in some examples, when the fuel level of the connected vehicle 112 is lower than a threshold fuel level that may be required to operate the connected vehicle 112 for a period of time or to a destination, one or more IoT devices may be programmed to stop generating and providing its vehicular data to the BC network 120.

BC network 120 may be implemented as a public BC network, a private BC network, or a hybrid BC network having a combination of both the public BC network and the private BC network. The BC network 120 may be permissioned or permissionless depending on participant's requirements, type of vehicular data to be shared and purpose of sharing vehicular data. Further, the BC network 120 may be an original BC network, which may be associated with the entities of the plurality of entities or a sidechain of a main BC network that may be associated with a subset of the plurality of entities. In an example, two or more entities may be identified from the plurality of entities to share full or partial vehicular data among the identified two or more entities through the BC network 120.

As illustrated in FIG. 1, the BC network 120 includes a plurality of BC nodes 122, a plurality of decentralized ledgers 124, a management device 126 and a smart contract 130. The smart contract may govern the functionalities of the BC network 120. The management device 126 may perform several functions to update, share and retrieve information from the decentralized ledgers 124. In some examples, the management system 126 may perform the functionalities of BC network according to various blockchain protocols and specifications and terms included in the smart contract 130.

The BC network 120 may record each event related to the connected vehicle 112, its vehicular data, or its surroundings that may be of interest to the connected vehicle 112 or the second entity 114. Each event may be recorded on the plurality of decentralized ledgers 124 of the BC network 120. The decentralized ledger(s) 124 may be composed of ledger blocks that each refer back to a hash of a prior ledger block. A block is generated corresponding to each step occurred or performed during occurrence of an event. The generated block includes information about the event, the participant entity provided the information about the event and time stamp of the recordation of the event. The information recorded in the block may be unencrypted, encrypted, or hashed. In some examples, when BC network 120 is a sidechain of a main blockchain, a blockchain node of the main BC network may store and update a corresponding main decentralized ledger.

An event may refer to any activity, operation or transaction, related to the connected vehicle 112 or its vehicular data, occurred or performed by the connected vehicle 112 or the second entity 114. Examples may include receipt of vehicular data from connected vehicle(s), an event of joining or leaving the BC network 120 by an entity, an alert on a traffic violation event, an alert on insurance rate revised, an alert for maintenance of the connected vehicle by a service provider, retrieval of all or partial of the vehicular data etc. In an example, an event may be any activity, operation or transaction related to unsafe driving, traffic violation, insurance, etc. An event may also include a query raised by any entity to find certain information related to a connected vehicle or vehicular data. In an example, an event occurred or performed in relation to connected vehicle or its vehicular data may be according to a verified event (that may be allowed to be recorded) as per the smart contract 130.

The plurality of BC nodes 122 may communicate with one another. Such communication may be via a peer-to-peer communication protocol. Each of the BC nodes 122 store a full or partial copy of the decentralized ledger 124. Each blockchain node 122 may be programmed with a blockchain agent that includes logic for interacting with other blockchain nodes, writing events, writing ledger entries, participating in consensus decisions, and/or performing other blockchain related functions according to various blockchain protocols and specifications.

The plurality of participant nodes associated with the first entity 112 and the second entity 114 may be the blockchain nodes 122 of the BC network 120. In other words, a participant node associated with each of the first entity 112 and the second entity 114 may be programmed with the blockchain agent. For example, an IoT device of the connected vehicle 112 may act as a blockchain node 122. A blockchain node of the blockchain nodes 122 may have a role-based access to the BC network 120 according to an access policy 134 (described below) and/or the rules that define the blockchain protocols and specifications. For example, a blockchain node associated with the connected vehicle 112 may have read and write access while another blockchain node associated with another participant entity (e.g., an insurance entity) may have read only access. Further, in some examples, the blockchain nodes 122 may access the BC network 120 through an authorization system (not shown in figures) that may permit or restrict respective blockchain node to access the BC network 120 according to the access policy 134 and/or the rules that define the blockchain protocols and specifications.

The smart contract 130 may include various policies that may govern the functionalities of the BC network 120. In an example, the smart contract 130 may include the access policy 134 that defines terms for accessing the BC network 120 and a data sharing policy 132 that defines terms for selectively sharing vehicular data of the connected vehicle 112 with other entities that may participate in the BC network 120.

In an example, the access policy 134 may include the registration model and/or the authorization system for accessing the BC network 120. In some instances, the access policy 134 may specify terms agreed to by various entities (e.g., the first entity 112 and the second entity 114) that access the BC network 120.

The data sharing policy 132 may include terms for selectively sharing the pool of vehicular data coming from the connected vehicle 112 with any other participant entity (e.g., the second entity 114) of the BC network 120. Selective sharing may mean sharing at least a part of data from the pool of vehicular data with different participant entities depending on the type of vehicular data and type of participant entities. The terms of the data sharing policy 132 may be defined by a user of the connected vehicle 112 in the smart contract 130. The terms of the data sharing policy 132 may dictate what parts of vehicular data to be shared with different participant entities of the BC network 120. In particular, the user may define terms for sharing a type of vehicular data with one or more participant entities and restricting to share that vehicular data with other entities. For example, vehicular data related to vehicle parts, vehicle usage, insurance records may be shared with an insurance entity, and may be restricted from being shared with another connected vehicle. In another example, vehicular data related to traffic congestion, road markings, traffic lights, etc. may be shared with another connected vehicle in a localized region but may be restricted from being shared with an insurance entity, a service provider and/or other connected vehicles that are not in the same localized region. This way, the data sharing policy 132 may allow the user of the connected vehicle 112 to selectively share the vehicular data with the second entity 114.

In some examples when the second entity 114 is another connected vehicle that provides its vehicular data, a user of the other connected vehicle may also provide another data sharing policy in the smart contract 130 for selectively sharing its vehicular data with other participant entities.

Furthermore, the data sharing policy 132 may include terms for monetizing (i.e., monetization terms) the vehicular data. The user of the connect vehicle 112 may define the monetization terms for monetizing all or partial of the vehicular data. In such examples, use and/or remuneration of all or partial of the vehicular data may be associated with a monetized award that may include local offers or crypto currency. Transfer of the monetized award may occur via the BC network 120 in accordance with the terms defined in the smart contract 130.

In addition, a user of a connected vehicle (e.g., the connected vehicle 112) may make changes, at any point of time, in the data sharing policy defined in the smart contract 130. For example, the user may add, remove or modify terms of the data sharing policy related to that connected vehicle.

In some scenarios, when information related to the occurrence of an accident or an emergency situation in a region is provided to the BC network 120, the BC network 120 may share this information with the second entity 114 without following data sharing policy and without requiring consensus. In some examples, the BC network 120 may share such information with all the participant entities in that region.

In some examples, the smart contract 130 may further include a life span policy 136. The life span policy 136 may include terms to terminate the BC network 120 after a period of time. In particular, the life span policy 136 may dictate how long the BC network 120 would exist. In a scenario where shared vehicular data may become meaningless or useless after a certain period of time, the BC network 120 may be terminated after that certain period of time. Terminating the BC network 120 may include discarding the BC network 120 and thereby removing or deleting decentralized ledger(s) 124, shared vehicular data, smart contract 130, permissions and other information stored in the participant nodes. In some examples, the life span policy 136 may also allow an entity (e.g., the second entity 112) to exit the BC network 120 after a period of time. The terms of the life span policy 136 may be defined by an entity that implements the BC network 120 or agreed to by various participant entities (e.g., the first entity 112 and the second entity 114) that access the BC network 120. As an example, the BC network 120 may be terminated or the connected vehicle 112 may exit the BC network 120 once the connected vehicle 112 stops operating or moves out of the defined geographic scope.

The management system 126 may manage the BC network 120 by performing various functions of the BC network 120 as described in the examples herein. The management system 126 may be a computing device that may be any suitable type of computing device as described herein. Most of the functionalities described as performed by BC network 120 may be performed by instructions stored on at least one machine readable medium of the management system 126, executed by at least one processing resource of the management system 126. The at least one machine readable medium may be non-transitory machine readable medium. The at least one machine readable medium may be implemented by volatile memory (e.g., one or more volatile memory devices, such as DRAM device(s), DIMM(s), or the like). In an example, the management system 126 may include logic or rules for automatically executing the terms of the smart contract 130.

When an entity accesses the BC network 120, the management system 126 may identify several information related to that entity and store the information in the at least one machine readable storage medium of the management system 126. In some examples, information related to the entity may include type of entity, identification of the entity, location and/or timezone information of the entity or other information. For example, when the connected vehicle 112 access the BC network 120, the management system 126 may determine information related to the connected vehicle 112 including details of connected vehicle 112 such as type of vehicle, manufacturer of the vehicle, speed and direction of the vehicle, identification of the vehicle (e.g., vehicle registration number etc.) and location and/or timezone of the connected vehicle 112.

The management system 126 may enroll (or register) the entity using the access policy 134 and generate a block in the decentralized ledger(s) 124 corresponding to the event of enrolling the entity. The block may include information including details of the event such as enrollment/registration of the entity and its location and/or timezone information. In some examples, the management system 126 may generate, using a hashing algorithm, a location hash including one or both the location and timezone information of the entity and integrate the location hash with the cryptographic hash (i.e., block hash) of the block generated in the decentralized ledger(s) 124. Any other information related to the entity such as type of entity, identification of the entity may or may not be included in the block depending on the entity. In case of a connected vehicle, information such as type of vehicle, identification of the vehicle, etc. for a connected vehicle may not be included in the block for the purpose of security.

In some examples, when the BC network 120 includes permissioned BC network, the management system 126 may validate the vehicle's certificate before enrolling connected vehicle(s). Further, in some example, upon enrolling a connected vehicle (e.g., the connected vehicle 112), the management system 126 may further enable the user of the connected vehicle to define the data sharing policy in the smart contract 130.

The management system 126 may perform similar process as described above for enrolling any entity (e.g., the second entity 114) depending on the type of the entity.

In some examples, when the management system 126 receives an event from the connected vehicle 112, the management system 126 may validate the event with other participant entities (e.g., the second entity 114) using consensus process as per blockchain protocols and specifications. Once consensus is reached, the management system 126 may record the event in the decentralized ledger 124 stored at the blockchain node(s) 122 associated with the connected vehicle 112.

Depending on the event received, the management system 126 may selectively share the event with the second entity 114 in accordance with the data sharing policy 132 defined in the smart contract 130. In order to selectively share the event, the management system 126 may selectively record the event in the decentralized ledger(s) 124 stored at the blockchain node(s) 122 associated with the second entity 114.

In some examples, upon receipt of vehicular data from the connected vehicle 112, the management system 126 may identify the data sharing policy 132 defined by the user of the connected vehicle 112 in the smart contract 130. In an example, the data sharing policy 132 may be identified based on the information of the connected vehicle 112 recorded in the BC network 120. For example, using vehicle registration number of the connected vehicle 112, the data sharing policy 132 defined by the user of the connected vehicle 112 may be identified. Once the data sharing policy 132 is identified, the management system 126 may execute the smart contract 130 between the connected vehicle 112 and the second entity 114 for selectively sharing the vehicular data with the second entity 114 in accordance with the data sharing policy 132. That is, the management system 126 may selectively share the vehicular data with the second entity 114 in accordance with the data sharing policy 132. In order to selectively share the vehicular data, the management system 126 may selectively record all or partial of the vehicular data in the decentralized ledger(s) 124 stored at the blockchain node(s) 122 associated with the second entity 114. As an example, the management system 126 may share vehicular data related to vehicle and vehicle driving with the second entity 114 if the second entity 114 is an insurance entity or a service provider for the vehicle maintenance. In another example, the management system 126 may share vehicular data related to road condition and traffic congestion with the second entity 114 if the second entity 114 is another connected vehicle.

In some examples when many other entities are associated to the BC network 120, the management system 126 may execute the smart contact between the connected vehicle 112 and one or more other entities for selectively sharing different types of vehicular data with different entities in accordance to the data sharing policy 132. Furthermore, in examples when the second entity 114 is another connected vehicle, the management system 126 may identify the data sharing policy of another connected vehicle from the smart contract 130 to selectively sharing the vehicular data of the other connected vehicle with the connected vehicle 112.

As discussed, some vehicular data such as traffic congestion, roadside assistance, road condition, etc. in a particular region or location may be relevant only to entities present in that particular region or location. In some examples, management system 126 may determine whether the connected vehicle 112 and the second entity 114 are present in same region based on the location and/or timezone information included in the respective block hashes for the connected vehicle 112 and the second entity 114. Upon determining that the connected vehicle 112 and the second entity 114 are present in the same location and/or timezone, the management system 126 may execute the smart contract 130 between the connected vehicle 112 and the second entity 114 to selectively share the vehicular data with the second entity 114. In an example, the management system 126 may selectively share the vehicular data with the second entity 114 in accordance with the data sharing policy 132 defined by the user of the connected vehicle 112 in the smart contract 130. In some examples, the management system 126 may identify many entities in the same region or location and selectively share the vehicular data with the entities in accordance with the data sharing policy 132.

Further, in examples where the data sharing policy 132 includes monetization terms, the management system 126 may share all or partial of the vehicular data in accordance with the monetization terms included in the data sharing policy 132. In such examples, the management system 126 may allow negotiation between the user of the connected vehicle 112 and the second entity 114 based on monetization terms. After negotiation, an updated smart contract between the user of the connected vehicle 112 and the second entity 114 may result. All terms of the updated smart contract may thereby be formed within an agreement that is accessible to both parties. In operation, executing the updated smart contract may include setting forth updated monetization terms defined within the updated smart contract.

Additional functions may include notarizing the smart contract 130 with an arbitrator in the BC network 120. The arbitrator may store records of the executed smart contract and/or the negotiation. The arbitrator may be a third party, separate from the entities involved in the negotiation. Notarization may refer to formally accepting the executed smart contract, and may include governmental notarization, third party notarization, electronic certification, and the like.

The BC network 130 shares the vehicular data on realtime basis. As alluded previously, vehicular data may be, periodically, collected and provided to the BC network 120. The management system 126 may periodically receive vehicular data from the connected vehicle 112 and dynamically share the received vehicular data with the second entity 114 as per the data sharing policy 132, every time the vehicular data is received.

In some examples, the BC network 120 may be searchable. An entity of the plurality of entities may search for information related to the connected vehicle 112, another connected vehicle or their vehicular data by querying the BC network 120. The BC network 120 may provide any available information in response to the query. In other words, desirable information may be retrieved from the BC network 120.

In order to ensure security and anonymity, information related to the connected vehicle(s) such as type of vehicle, identification of the vehicle, or any other detail about the vehicle (that may affect the security and anonymity) may not be included in the decentralized ledger(s) while sharing vehicular data or an event with other entities unless required in certain scenarios. For example, while sharing driving details or vehicle usage with an insurance entity, such information related to a connected vehicle may be shared, which may be defined in a data sharing policy of the connected vehicle.

Figure 2:
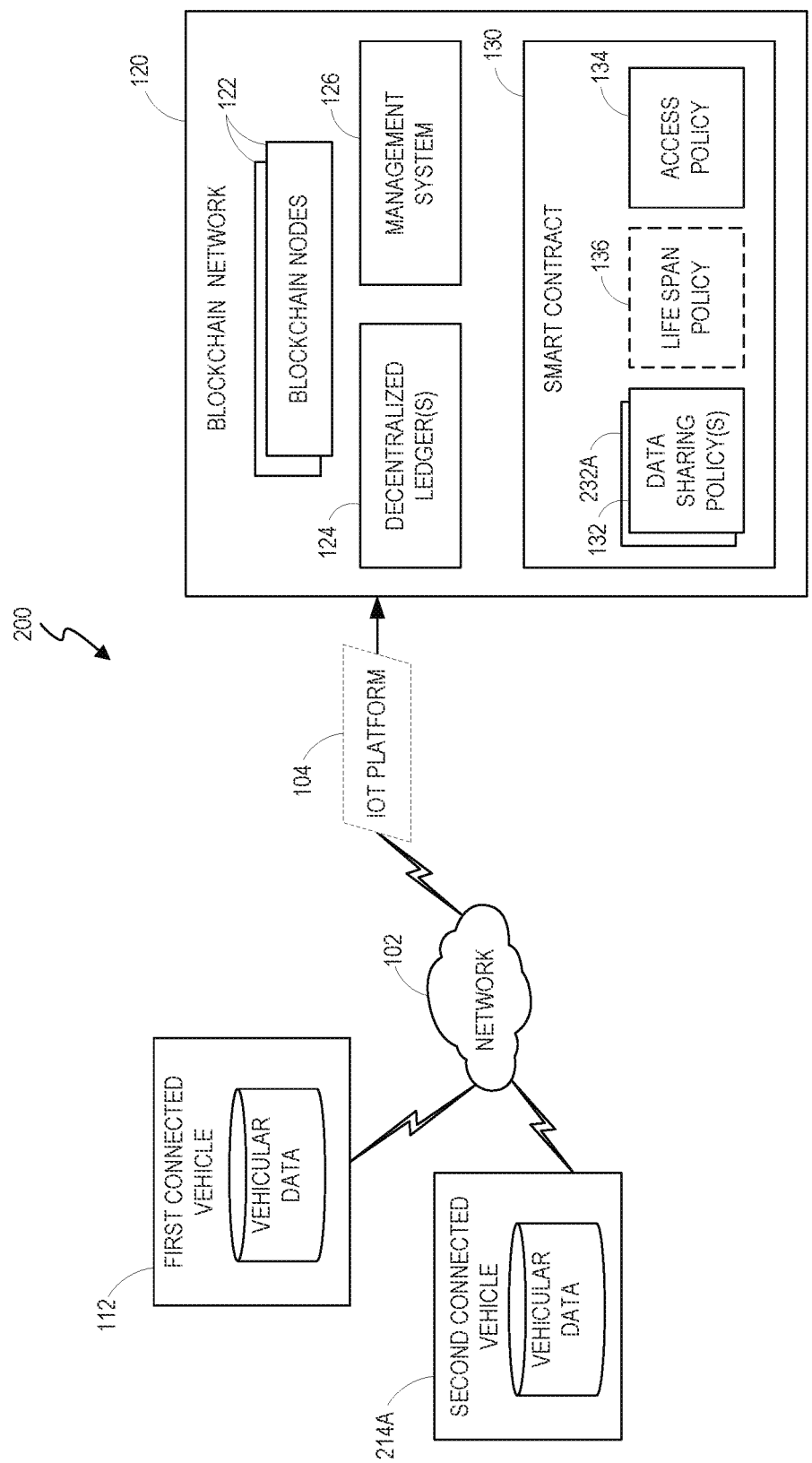
FIG. 2 is a block diagram of a system including a BC network associated with a first connected vehicle and a second connected vehicle, in accordance with another example.

FIG. 2 illustrates a system 200 in accordance with another example. System 200 may include certain elements similar to those described in FIG. 1 which are marked with similar reference numerals, description of which are not repeated herein. In comparison to FIG. 1, the system 200 of FIG. 2 is shown to include multiple connected vehicles. As depicted in FIG. 2, system 200 may include the connected vehicle 112 that is a first connected vehicle and a second connected vehicle 214A associated with the BC network 120.

In a similar fashion as described in FIG. 1, the first connected vehicle 112 and the second connected vehicle 214A may be registered with the BC network 120 as participants. At the time of enrolling/registering, users of the first connected vehicle 112 and the second connected vehicle 214A may define respectively a first data sharing policy (i.e., the data sharing policy 132) and a second data sharing policy 232A. In addition, their locations and/or timezone information may be determined and recorded in the BC network 120. During operation, the first connected vehicle 112 and the second connected vehicle 214A may generate vehicular data and provide their respective vehicular data to the BC network 120. In an example, the BC network 120 may receive one or more of the vehicular data of the first connected vehicle 112 and the vehicular data of the second connected vehicle 214A via the IoT platform 104. The BC network 120 may, then, share the respective vehicular data of the first connected vehicle 112 and the second connected vehicle 214A with each other in accordance with the first data sharing policy 132 and the second data sharing policy 232A. The BC network 120 may perform similar functions and operations as described in conjunction with FIG. 1. In some examples, the BC network 120 may terminate in a period of time as defined in the life span policy(s) 136.

In some examples, more than two connected vehicles may be associated with the BC network 120. In these examples, two or more connected vehicles may be identified that are present in a localized region. In such examples, the BC network 120 may communicate and share their respective vehicular data between two or more identified connected vehicles in accordance with their respective data sharing policies.

Figure 3:
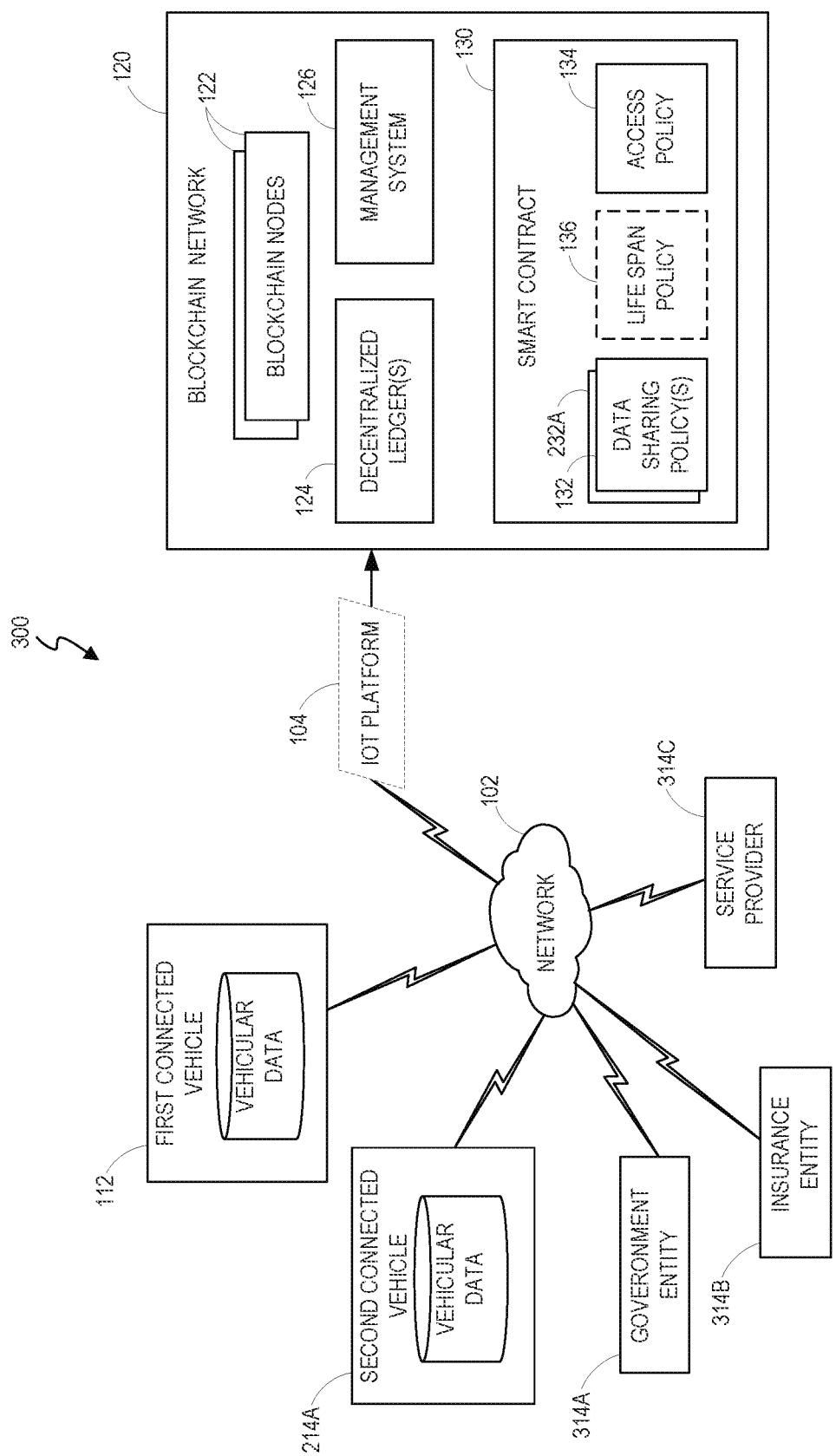
FIG. 3 is a block diagram of a system including a BC network associated with many different entities, in accordance with yet another example.

FIG. 3 illustrates a system 300 in accordance with another example. System 300 may include certain elements similar to those described in FIG. 1 which are marked with similar reference numerals, description of which are not repeated herein. In comparison to FIG. 1, the system 300 of FIG. 3 is shown to include multiple different entities in a predefined geographic scope. For example, the entities, as depicted in FIG. 3, may include but are not limited to, a second connected vehicle 214A, a government entity 314A, an insurance entity 314B, and a service provider 314C.

In a similar fashion as described in FIG. 1, the first connected vehicle 112, the second connected vehicle 214A, the government entity 314A, the insurance entity 314B, and the service provider 314C may be registered with the BC network 120 as participants. At the time of enrolling/registering, locations and/or timezone information of each entity may be determined and recorded in the BC network 120. In addition, users of the first connected vehicle 112 and the second connected vehicle 214B may have defined respectively the first data sharing policy 132 and the second data sharing policy 232A in the smart contract 130. The first connected vehicle 112 and the second connected vehicle 214A may generate vehicular data and provide their respective vehicular data to the BC network 120. The BC network 120 may communicate and share their vehicular data among all entities (i.e., the first connected vehicle 112, the second connected vehicle 214A, the government entity 314A, the insurance entity 314B, and the service provider 314C) in accordance with the first data sharing policy 132 and the second data sharing policy 232A. The BC network 120 may perform similar functions and operations as described in conjunction with FIG. 1. In some examples, the BC network 120 may terminate in a period of time as defined in the life span policy 136.

In some examples, two or more entities may be identified from the first connected vehicle, the second connected vehicle 214A, the government entity 314A, the insurance entity 314B, and the service provider 314C, that are present in a localized region. In such examples, the BC network 120 may communicate and share the respective vehicular data between two or more identified entities in accordance with their respective data sharing policy(s).

Figure 4:
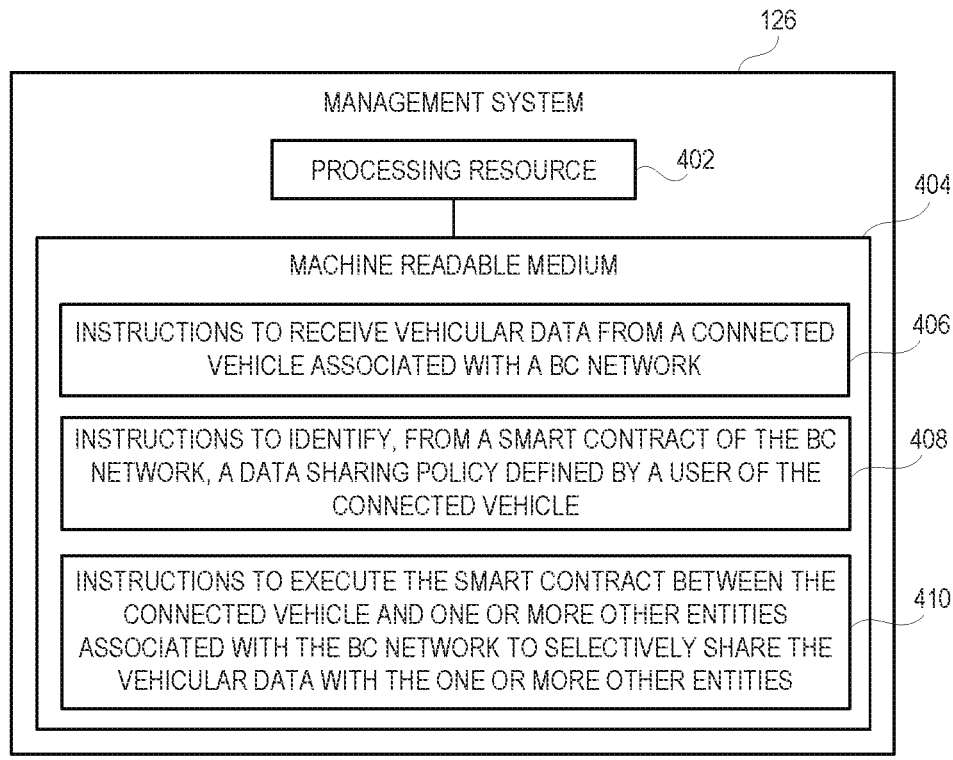
FIG. 4 is a block diagram depicting a processing resource and a memory encoded with instructions to share vehicular data through a BC network, in accordance with an example.

FIG. 4 illustrates management system 126 including a processing resource 402 communicatively coupled to a machine readable storage medium 404. The machine readable medium 404 may be non-transitory machine readable medium including (e.g., encoded with) at least instructions 406, 408 and 410 executable by the processing resource 402 to implement all or some of the functionalities described herein in relation to instructions 406-410. For ease of illustration, instructions 406-410 will be described with reference to system 100 of FIG. 1. As will be appreciated, features described herein are also applicable to system 200 of FIG. 2 and system 300 of FIG. 3.

Instructions 406, when executed, may cause processing resource 402 to receive vehicular data from the connected vehicle 112. In some examples, the vehicular data may be validated with other participant entities (e.g., the second entity 114) using consensus process as per blockchain protocols and specifications. Once consensus is reached, the vehicular data may be recorded in the decentralized ledger 124 stored at the blockchain node(s) 122 associated with the connected vehicle 112.

Instructions 408, when executed, may cause processing resource 402 to identify the data sharing policy 132 defined by the user of the connected vehicle 112 in the smart contract 130. In an example, the data sharing policy 132 may be identified based on the information of the connected vehicle 112 recorded in the BC network 120. For example, using vehicle registration number of the connected vehicle 112, the data sharing policy 132 defined by the user of the connected vehicle 112 may be identified.

Once the data sharing policy 132 of the connected vehicle 112 is identified, instructions 410, when executed may cause processing resource 402 to execute the smart contract 130 between the connected vehicle 112 and the second entity 114 for selectively sharing all or partial of the vehicular data with the second entity 114 in accordance with the data sharing policy 132. In these examples, instructions 410 may include instructions to selectively record all or partial of the vehicular data in the decentralized ledger(s) 124 stored at the blockchain node(s) 122 associated with the second entity 114.

In some examples, machine readable medium 404 further includes instructions, when executed, may cause processing resource 402 to determine whether the connected vehicle 112 and the second entity 114 are present in same localized region based on the location and/or timezone information included in the respective block hashes for the connected vehicle 112 and the second entity 114. Upon determining that the connected vehicle 112 and the second entity 114 are present in the same localized region, all or partial of the vehicular data may be selectively shared with the second entity 114 in accordance with the data sharing policy 132 defined by the user of the connected vehicle 112 in the smart contract 130.

In some examples where multiple entities are associated with the BC network 120, instructions 410 include instructions to selectively share the vehicular data between the connected vehicle 112 and the one or more entities in accordance with the data sharing policy 132.

Figure 5:
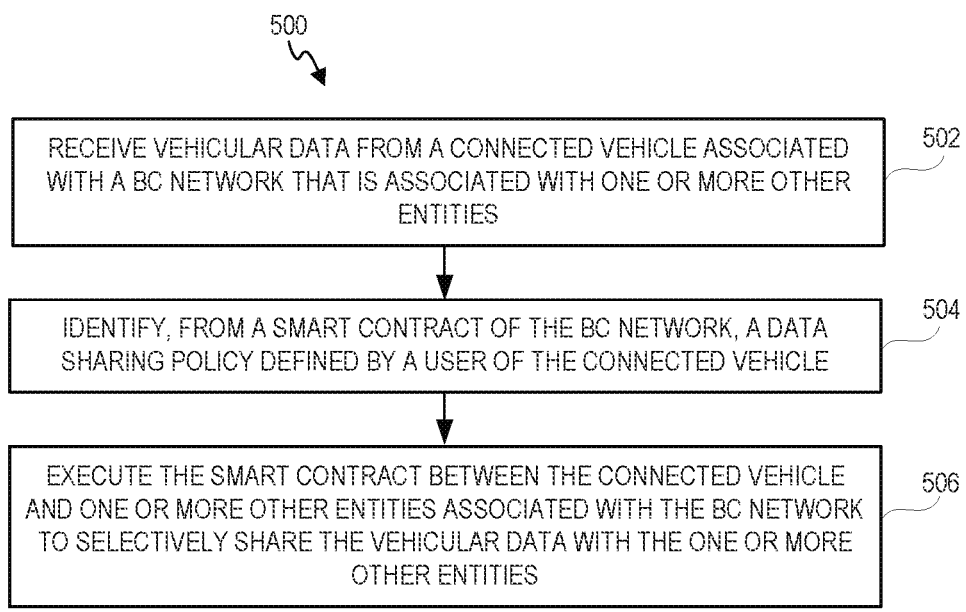
FIG. 5 is a flow chart illustrating a method for sharing vehicular data through a BC network, in accordance with an example.
Figure 6:
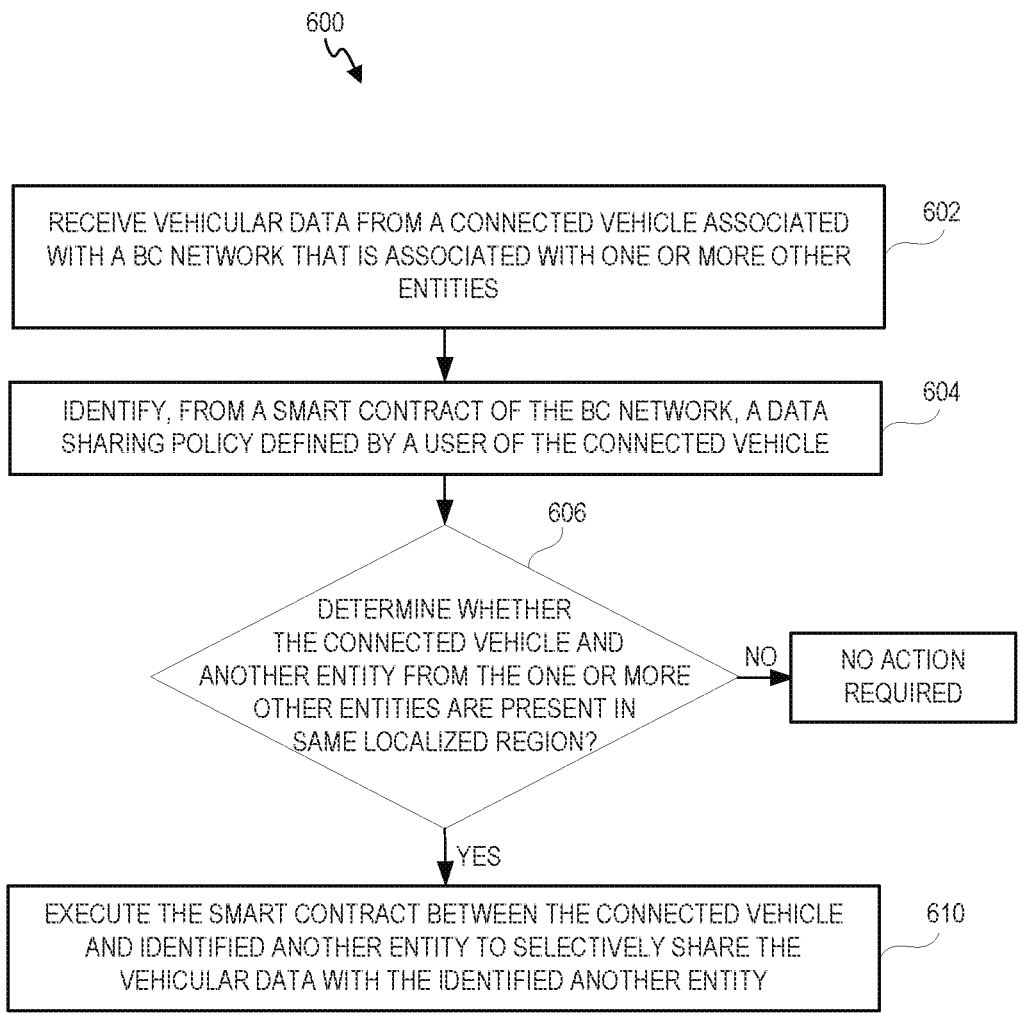
FIG. 6 is a flow chart illustrating a method for sharing vehicular data through a BC network, in accordance with another example.

Although not shown in FIG. 4, machine readable medium 404 may also include additional program instructions to perform various other method blocks described in FIGS. 5 and 6.

FIGS. 5 and 6 depict flowcharts illustrating example methods 500 and 600 for selectively sharing vehicular data among a plurality of entities, in a defined geographic scope, associated with a BC network. Each entity of the plurality of entities may be a participant of the BC network. For ease of illustration, the execution of methods 500 and 600 is described with reference to system 100 of FIG. 1. As will be appreciated, features described herein may also be applicable to system 200 of FIG. 2 and system 300 of FIG. 3. Methods 500 and 600 may be executed by the management system 126 of the BC network 120. In an example, the methods 500 and 600 are performed by the processing resource 402 by executing the instructions 406-410 stored in the machine readable medium 404. (FIG. 4). Additionally, implementation of methods 500 and 600 is not limited to such examples. Although the flowcharts of FIGS. 5 and 6, individually, show a specific order of performance of certain functionalities, methods 500 and 600 are not limited to such order. For example, the functionalities shown in succession in the flowcharts may be performed in a different order, may be executed concurrently or with partial concurrence, or a combination thereof.

Referring now to FIG. 5, in block 502, vehicular data may be received from the connected vehicle 112. In some examples, upon receipt of the vehicular data (i.e., the pool of the vehicular data coming from the connected vehicle 112), the vehicular data may be validated with other participant entities (e.g., the second entity 114) using consensus process as per blockchain protocols and specifications. Once consensus is reached, the vehicular data may be recorded in the decentralized ledger 124 stored at the blockchain node(s) 122 associated with the connected vehicle 112.

In block 504, the data sharing policy 132 may be identified based on the information of the connected vehicle 112 recorded in the BC network 120. For example, the data sharing policy 132 defined by the user of the connected vehicle 112 may be identified using vehicle registration number of the connected vehicle 112.

In block 506, the smart contract 130 may be executed between the connected vehicle 112 and the second entity 114 for selectively sharing all or partial of the vehicular data with the second entity 114 in accordance with the data sharing policy 132. In these examples, all or partial of the vehicular data may be selectively recorded in the decentralized ledger(s) 124 stored at the blockchain node(s) 122 associated with the second entity 114. In some examples where multiple entities are associated with the BC network 120, all or partial of the vehicular data may be selectively shared between the connected vehicle 112 and the one or more other entities in accordance with the data sharing policy 132.

Referring to FIG. 6, the method 600 includes certain blocks that are similar to one or more blocks described in FIG. 5, details of which are not repeated herein for the sake of brevity. By way of example, the method blocks 602 and 604 of FIG. 6 are similar to method blocks 502 and 504, respectively, of FIG. 5.

In block 602, vehicular data may be received from the connected vehicle 112. In block 604, the data sharing policy 132 may be identified based on the information of the connected vehicle 112 recorded in the BC network 120. In block 606, it may be determined whether the connected vehicle 112 and the second entity 114 are present in same localized region based on the location and/or timezone information included in the respective block hashes for the connected vehicle 112 and the second entity 114. Upon determining that the connected vehicle 112 and the second entity 114 are not present in the same localized ("NO" at block 606), no further action may be required. That is, no vehicular data may be shared. Upon determining that the connected vehicle 112 and the second entity 114 are present in the same localized region ("YES" at block 606), in block 610, the smart contract 130 may be executed between the connected vehicle 112 and the second entity 114 for selectively sharing all or partial of the vehicular data with the second entity 114 in accordance with the data sharing policy 132. In some examples, many entities may be identified in the same region or location and all or partial of the vehicular data may be selectively shared with one or more entities in accordance with the data sharing policy 132.

As used herein, a "computing device" may be a server, storage system, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIGS. 1-3, BC network 120, management device 126, various entities (e.g., first entity 112, second entity 114) and IoT platform 104 may each be implemented by one machine-readable storage medium, or multiple machine-readable storage media.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations

The invention claimed is:

1. A system comprising:
   a blockchain network associated with a plurality of entities in a defined geographic scope, wherein a first entity of the plurality of entities comprises a connected vehicle that generates vehicular data, and
   wherein the blockchain network comprises:
      a smart contract comprising:
         a data sharing policy defined by a user of the connected vehicle, and
         an access policy defining terms for access of the blockchain network; and
      a management system comprising a hardware processor and a non-transitory storage medium comprising instructions executable on the hardware processor to:
         register the connected vehicle with the blockchain network according to the access policy,
         receive the vehicular data from the connected vehicle,
         identify the data sharing policy based on an identifier of the connected vehicle,
         based on the identification of the data sharing policy, determine whether the connected vehicle and a second entity of the plurality of entities are located in a localized geographic region according to the defined geographic scope,
         selectively share, by executing the smart contract, a portion of the vehicular data with the second entity based on determining that the connected vehicle and the second entity are located in the localized geographic region, wherein the selective sharing of the portion of the vehicular data provides a secure and autonomous communication of the portion of the vehicular data over a communication network to protect a security of the vehicular data, and
         record the portion of the vehicular data in a ledger of the blockchain network.

2. The system of claim 1, wherein the connected vehicle comprises an electronic device that is a participant node of the blockchain network.

3. The system of claim 1, wherein the defined geographic scope is based on the data sharing policy.

4. The system of claim 2, wherein the portion of the vehicular data comprises sensor data collected by the electronic device from a sensor in the connected vehicle.

5. The system of claim 1, wherein the vehicular data comprises onboard vehicle monitoring data, Vehicle-to-Vehicle (V2V) data, or Vehicle-to-Infrastructure (V2I) data.

6. The system of claim 2, wherein the electronic device comprises an Internet of Things (IoT) device to collect the vehicular data, and the vehicular data is received by the management system of the blockchain network from the IoT device through an IoT platform.

7. The system of claim 1, wherein the access policy specifies that a blockchain node of the connected vehicle has read and write access to the blockchain network, and that a blockchain node of the second entity has read only access to the blockchain network.

8. The system of claim 1, wherein the data sharing policy specifies that the portion of the vehicular data shareable with other entities comprises traffic information, and that a further portion of the vehicular data comprising information of a vehicle part of the connected vehicle is restricted from being shared, and wherein the instructions are executable on the hardware processor of the management system to:
   identify the further portion of the vehicular data comprising the information of the vehicle part, and
   prevent, according to the data sharing policy, sharing of the further portion of the vehicular data with the second entity.

9. The system of claim 1, wherein the instructions are executable on the hardware processor of the management system to:
- validate a certificate of the connected vehicle, and
- register the connected vehicle based on validating the certificate of the connected vehicle.

10. The system of claim 1, wherein the smart contract comprises a life span policy that specifies a termination of the blockchain network based on the connected vehicle moving out of the localized geographic region.

11. The system of claim 10, wherein the termination of the blockchain network based on the connected vehicle moving out of the localized geographic region comprises deleting ledgers of the blockchain network and shared vehicular data stored in participant nodes of the blockchain network.

12. The system of claim 10, wherein the termination of the blockchain network based on the connected vehicle moving out of the localized geographic region comprises deleting the smart contract of the blockchain network.

13. The system of claim 1, wherein the instructions are executable on the hardware processor of the management system to:
- determine a location of the connected vehicle as part of registering the connected vehicle with the blockchain network, and
- record information of the location of the connected vehicle in the ledger of the blockchain network.

14. The system of claim 13, wherein the instructions are executable on the hardware processor of the management system to:
- compute a hash of the location of the connected vehicle, wherein the information of the location of the connected vehicle recorded in the ledger of the blockchain network comprises the hash.

15. A non-transitory storage medium comprising instructions that upon execution cause a management system of a blockchain network to:
- register a vehicle with the blockchain network according to an access policy of a smart contract of the blockchain network, the access policy defining terms for access of the blockchain network;
- receive, at the management system of the blockchain network, vehicular data from the vehicle that is an entity of a plurality of entities associated with the blockchain network in a defined geographic scope;
- identify a data sharing policy of the smart contract based on an identifier of the vehicle;
- based on the identification of the data sharing policy, determine whether the vehicle and a second entity of the plurality of entities are located in a localized geographic region according to the defined geographic scope;
- selectively share, by executing the smart contract, a portion of the vehicular data with the second entity based on determining that the vehicle and the second entity are located in the localized geographic region, wherein the selective sharing of the portion of the vehicular data provides a secure and autonomous communication of the portion of the vehicular data over a communication network to protect a security of the vehicular data; and
- record the portion of the vehicular data in a ledger of the blockchain network.

16. The non-transitory storage medium of claim 15, wherein the smart contract comprises a life span policy that specifies a termination of the blockchain network based on the vehicle moving out of the localized geographic region.

17. The non-transitory storage medium of claim 16, wherein the termination of the blockchain network based on the vehicle moving out of the localized geographic region comprises deleting ledgers of the blockchain network and the smart contract stored in participant nodes of the blockchain network.

18. The non-transitory storage medium of claim 15, wherein the access policy specifies that a blockchain node of the vehicle has read and write access to the blockchain network, and that a blockchain node of the second entity has read only access to the blockchain network.

19. A method comprising:
- registering, by a management system of a blockchain network, a vehicle with the blockchain network according to an access policy of a smart contract of the blockchain network, the access policy defining terms for access of the blockchain network;
- receiving, at the management system, vehicular data from the vehicle that is an entity of a plurality of entities associated with the blockchain network in a defined geographic scope;
- identifying, by the management system, a data sharing policy of the smart contract based on an identifier of the vehicle;
- based on the identification of the data sharing policy, determining, by the management system, whether the vehicle and a second entity of the plurality of entities are located in a localized geographic region according to the defined geographic scope;
- selectively sharing, by the management system by executing the smart contract, a portion of the vehicular data with the second entity based on determining that the vehicle and the second entity are located in the localized geographic region, wherein the selective sharing of the portion of the vehicular data provides a secure and autonomous communication of the portion of the vehicular data over a communication network to protect a security of the vehicular data; and
- recording, by the management system, the portion of the vehicular data in a ledger of the blockchain network.

20. The method of claim 19, wherein the smart contract comprises a life span policy that specifies a termination of the blockchain network based on the vehicle moving out of the localized geographic region, and wherein the termination of the blockchain network based on the vehicle moving out of the localized geographic region comprises deleting ledgers of the blockchain network and the smart contract stored in participant nodes of the blockchain network.

* * * * *